(12) United States Patent
Kung et al.

(10) Patent No.: US 6,993,915 B2
(45) Date of Patent: Feb. 7, 2006

(54) SOLID PROPELLANT GAS GENERATORS IN POWER SYSTEMS

(75) Inventors: Ru-Li Kung, Walnut, CA (US); Scott J. Goldberg, Irvine, CA (US); Alex Morando, Rowland Heights, CA (US); Tom Iles, Rancho Palos Verde, CA (US)

(73) Assignee: Honeywell International Inc., Morristown, NJ (US)

( * ) Notice: Subject to any disclaimer, the term of this patent is extended or adjusted under 35 U.S.C. 154(b) by 41 days.

(21) Appl. No.: 10/789,177

(22) Filed: Feb. 26, 2004

(65) Prior Publication Data

US 2005/0188701 A1 Sep. 1, 2005

(51) Int. Cl.
*F02C 7/272* (2006.01)

(52) U.S. Cl. .......................................... 60/772; 60/789
(58) Field of Classification Search ................. 60/772, 60/786, 787, 789, 39.464
See application file for complete search history.

(56) References Cited

U.S. PATENT DOCUMENTS

| 3,680,317 | A | * | 8/1972 | Kotoc .......................... 60/269 |
| 3,750,394 | A | * | 8/1973 | Larsen et al. .................. 60/789 |
| 4,505,105 | A | | 3/1985 | Ness |
| 4,591,314 | A | | 5/1986 | Weber |
| 4,599,044 | A | | 7/1986 | Jacobson |
| 4,619,111 | A | | 10/1986 | Whiteman |
| 4,671,744 | A | | 6/1987 | Shaffer |
| 4,819,423 | A | | 4/1989 | Vershure |
| 4,864,812 | A | | 9/1989 | Rodgers |
| 6,316,841 | B1 | | 11/2001 | Weber |

* cited by examiner

*Primary Examiner*—Ehud Gartenberg
(74) *Attorney, Agent, or Firm*—Oral Caglar, Esq.

(57) ABSTRACT

An emergency power system comprising a plurality of solid propellant gas generators each having a gas outlet in fluid communication with a turbine wheel rotationally disposed within a gas turbine housing, the turbine wheel being in rotational communication with an electric generator input shaft, a fluid pump input shaft, or both. A method of producing power from such an emergency power system is also disclosed.

15 Claims, 4 Drawing Sheets

SOLID PROPELLANT GAS GENERATORS IN POWER SYSTEMS

BACKGROUND OF THE INVENTION

The present invention generally relates to apparatus and methods for an emergency power system. More specifically, the present invention relates to an emergency power system comprising a plurality of solid propellant gas generators operable to produce a quantity of gas at a sufficient pressure for delivery to a turbine power unit (TPU) to provide output power as a part of an emergency power system (EPS).

Vehicles such as aircraft may include an environmental control system for providing temperature conditioned, pressurized air to the pilot, passengers, and heat generating electronics; and an auxiliary power unit may be used to supply auxiliary power for the aircraft, typically when either the aircraft is on the ground or flying at low altitudes (e.g., below about 30,000 ft). The aircraft may also include an emergency power unit to provide emergency power in the event of a failure or other condition that may threaten operation of the vehicle. An emergency power unit may include a self-contained fuel and oxidizer supply commonly known as a stored energy system, which may be insensitive to altitude and which may be operable to be activated quickly for rapid starting of the emergency power system.

Systems that may be powered by an emergency power system may include, for example, a hydraulic power supply system that may be utilized to supply hydraulic power for components and systems required to guide the aircraft, and an electrical generator that may be utilized for providing electrical power to various electrical systems within the aircraft. Both the hydraulic power supply system and the electrical system may be powered by a gas-driven turbine rotationally connected thereto. In an emergency situation, the gas which may be used to drive this turbine may be produced by the emergency power system through combustion of a propellant within a gas generator, which may be ignited upon demand.

Gas generators or combustors which may be used in an emergency power system may include a liquid propellant system, which may include a two part liquid propellant system, or a single liquid propellant system. Liquid propellant systems may have the advantage of being turned on and off as the need arises. Examples of prior art liquid propellant systems include that disclosed in U.S. Pat. No. 4,864,812, directed to an emergency power unit comprising a two part liquid propellant comprising a compressed oxidizer, and a fuel which may be combusted in a combustor to produce an amount of gas at a pressure suitable for use in generating power. However, such systems may require tanks, pumps, controls and the like to store the oxidizer and to meter delivery of the oxidizer and the fuel during operation. Accordingly, a two-part liquid propellant system may add complexity, weight, and cost to an aircraft.

U.S. Pat. No. 4,505,105 is directed to a one-part or single fuel gas generation system that utilizes hydrazine, or the like, as a fuel to generate gas in an amount and at a pressure suitable for use in powering an emergency power unit. In such a system, a catalyst bed is used to convert the hydrazine or other single propellant into a gas. While such systems may reduce the weight and cost associated with storing and delivering an oxidizer, such systems, may require storage and servicing of a highly reactive fuel, and maintenance of a catalyst bed. Also, single fuels (e.g., hydrazine) of a one part gas generation system may be toxic, and thus may present safety issues related to fuel toxicity, as well as to explosion hazards. Maintaining catalyst bed integrity, and preventing fouling or poisoning of the catalyst, may also challenge the reliability of such systems.

A solid propellant may also be utilized within a gas generation system to produce an amount of gas at a pressure suitable to drive a gas turbine of, for example, an emergency power unit. Solid propellants may be beneficial from a safety and reliability point of view, especially in single use applications. For example, U.S. Pat. No. 4,599,044 is directed to a thrust vector control system for use in a guided missile, in which a solid propellant gas generator is ignited to power a turbine-driven pump for driving hydraulic actuators for controlling systems on the guided missile. However, unlike liquid propellant systems, solid propellant systems may not be turned on and then turned off as the need arises. Once a solid propellant gas generator is actuated (i.e., begins to burn), it may be required to continue to do so until the solid propellant is exhausted.

The design of solid propellant gas generators used for an application with an unknown duty cycle, or an unknown output power requirement over a period of time, may be required to be sized to a "worse case" proportion, such that once actuated, the solid propellant gas generator may be capable of supplying enough gas to operate all the systems which could be affected, even though all of these systems may not be affected in a particular case. In addition, solid propellant may be heavier than are liquid counterparts, especially in light of the need to oversize such a unit to a worse case proportion.

Other factors that may affect the usefulness of a solid propellant gas generator may include the burn rate of the solid propellant, which may be affected by a number of variables. The composition of the solid propellant may affect the burn rate of a solid propellant. In addition, the solid propellant burn rate may be sensitive to initial propellant temperature e.g., the solid propellant may burn faster if the propellant is warm, and slower if the propellant is cold. The burn rate may also be sensitive to the gas pressure developed within a chamber of the solid propellant gas generator as the solid propellant burns e.g., high pressures in the chamber may increase the burn rate. The rate at which the solid propellant burns thus may determine the quantity and the pressure of the gas delivered to a turbine inlet of a gas turbine housing.

Also, the power demand of an aircraft may not be constant, and may thus include periods of high energy, usage which may require periods of high gas flow for power generation. An aircraft may also experience periods requiring much lower energy usage, thus requiring much lower gas flow demand. In order to prevent overspeed of the gas-driven turbine during periods of low power demand (e.g., due to an excess of gas being supplied to the turbine), an artificial load may be maintained on the power generation apparatus, e.g., a hydraulic relief valve may be included in a hydraulic circuit to maintain loading on a pump, the excess energy may then be dissipated as heat. This approach however, may require increasing the size of an oil reservoir or other components which supply oil to the hydraulic circuit, which may add weight to the aircraft. The gas generator and related propellant sizing and weight may also have to be increased for this approach.

Solid propellants may also produce particulate matter as they burn that may foul or otherwise render inoperable various components of a power system which utilizes a gas turbine. Particulate matter may thus limit the use of solid propellant gas generators in various applications that may require reuse and longevity of a component or system.

As can be seen, there is a need for an improved apparatus and method that may utilize solid propellants for gas generation in emergency power units or systems.

SUMMARY OF THE INVENTION

In one aspect of the present invention, an emergency power system comprises a plurality of solid propellant gas generators each having a gas outlet in fluid communication with a turbine wheel rotationally disposed within a gas turbine housing; and the turbine wheel being in rotational communication with an electric generator input shaft, a fluid pump input shaft, or both.

In another aspect of the present invention, an emergency power system comprises a plurality of solid propellant gas generators each having a gas outlet in fluid communication with a first conduit; the first conduit being in fluid communication with a second conduit through a fixed area flow restriction orifice; the first conduit being in fluid communication with a third conduit; the third conduit being in fluid communication with a flow control valve inlet of a flow control valve; the flow control valve having a first control valve position wherein the flow control valve inlet is in fluid communication with the second conduit through the flow control valve; the flow control valve having a second control valve position wherein the flow control valve inlet is closed; the flow control valve having a third control valve position wherein the flow control valve inlet is in fluid communication with an external environment; the second conduit being in fluid communication with a turbine inlet of a gas turbine housing; each of the solid propellant gas generators being individually actuatable to provide a gaseous output capable of turning a turbine wheel rotationally disposed within the gas turbine housing; the turbine wheel being in rotational communication with an electric generator input shaft, a fluid pump input shaft, or both.

In yet another aspect of the present invention, an emergency power system comprises a plurality of solid propellant gas generators each having a gas outlet in fluid communication with a turbine wheel rotationally disposed within a gas turbine housing; a fixed area flow restriction orifice disposed between, and in fluid communication with, the gas outlet and the turbine wheel; a vent valve in fluid communication with the gas outlet capable of providing fluid communication between the gas outlet and an external environment; each of the solid propellant gas generators being individually actuatable to provide a gaseous output capable of turning the turbine wheel rotationally disposed within the gas turbine housing; and the turbine wheel being in rotational communication with an electric generator input shaft, a fluid pump input shaft, or a combination thereof.

In still another aspect of the present invention, an emergency power system comprises a plurality of solid propellant gas generators each having a gas outlet in fluid communication with a turbine wheel rotationally disposed within a gas turbine housing, a fixed area flow restriction orifice disposed between, and in fluid communication with the gas outlet and the turbine wheel; each of the solid propellant gas generators being individually actuatable to provide a gaseous output capable of turning the turbine wheel rotationally disposed within the gas turbine housing; each of the solid propellant gas generators being capable of providing a gaseous output having a temperature at the turbine wheel of about 1800° F. or less; and the turbine wheel being in rotational communication with an electric generator input shaft, a fluid pump input shaft, or a combination thereof.

In still a further aspect of the present invention, an aircraft comprises an emergency power system, the emergency power system comprises a plurality of solid propellant gas generators each having a gas outlet in fluid communication with a turbine wheel rotationally disposed within a gas turbine housing; and the turbine wheel being in rotational communication with an electric generator input shaft, a fluid pump input shaft, or a combination thereof.

In yet a further aspect of the present invention, an emergency power system comprises a plurality of solid propellant gas generators each having a gas outlet in fluid communication with a turbine wheel rotationally disposed within a gas turbine housing, a fixed area flow restriction orifice disposed between, and in fluid communication with, the gas outlet and the turbine wheel; and in fluid communication with, the gas outlet and the turbine wheel; a vent valve in fluid communication with the gas outlet capable of providing fluid communication between the gas outlet and an external environment; a compressed gas assist valve having a compressed gas assist valve inlet in fluid communication with a compressed gas tank, wherein the compressed gas assist valve is capable of providing fluid communication between a compressed gas disposed within the compressed gas tank and the turbine wheel through the compressed gas assist valve inlet; a dump valve capable of providing fluid communication between the gas outlet and the external environment, while simultaneously preventing fluid communication between the turbine wheel and the gas outlet; a system controller capable of controlling the vent valve, the compressed gas assist valve, and the dump valve based on a rotational speed of the turbine wheel; wherein each of the solid propellant gas generators is individually actuatable to provide a gaseous output capable of rotating the turbine wheel; wherein each of the solid propellant gas generators is capable of providing the gaseous output having a temperature at the turbine wheel of about 1800° F. or less; wherein each of the solid propellant gas generators comprise a solid propellant in an amount capable of providing the gaseous output in an amount to produce a pressure of gaseous output of about 200 pounds per square inch (psi) to about 1000 psi for a period of at least about 5 minutes; and the turbine wheel being in rotational communication with an electric generator input shaft, a fluid pump input shaft, or a combination thereof.

In yet another aspect of the present invention, a method of providing emergency power comprises actuating at least one of a plurality of solid propellant gas generators of an emergency power system; and producing emergency power therefrom, wherein the emergency power system comprises the plurality of solid propellant gas generators each having a gas outlet in fluid communication with a turbine wheel rotationally disposed within a gas turbine housing; and the turbine wheel being in rotational communication with an electric generator input shaft, a fluid pump input shaft, or a combination thereof.

These and other features, aspects, and advantages of the present invention will become better understood with reference to the following drawings, description, and claims.

DETAILED DESCRIPTION OF THE INVENTION

The following detailed description is of the best currently contemplated modes of carrying out the invention. The description is not to be taken in a limiting sense, but is made merely for the purpose of illustrating the general principle of the invention, since the scope of the invention is best defined by the appended claims.

The present invention generally provides an emergency power system comprising a plurality of solid propellant gas generators, each having a gas outlet in fluid communication with a gas turbine inlet of a gas turbine housing. Actuation of the solid propellant gas generator may produce delivery of a quantity of gas at a pressure sufficient to turn a turbine wheel rotationally disposed within the gas turbine housing. The turbine wheel may then be in rotational communication with an input shaft of a pump and/or a generator which may be required to operate systems aboard an aircraft or other vehicle. This is unlike the prior art, wherein a solid propellant gas generator may include a single solid propellant gas generator.

The present invention also provides for an emergency power system comprising a plurality of solid propellant gas generators each having a gas outlet in fluid communication with a gas turbine inlet of a gas turbine housing, wherein each of the solid propellant gas generators may be individually actuatable, and/or simultaneously actuatable to provide a gaseous output capable of turning a turbine wheel rotationally disposed within the gas turbine housing. This is unlike the prior art, wherein merely a single solid propellant gas generator may be used.

Figure 1:
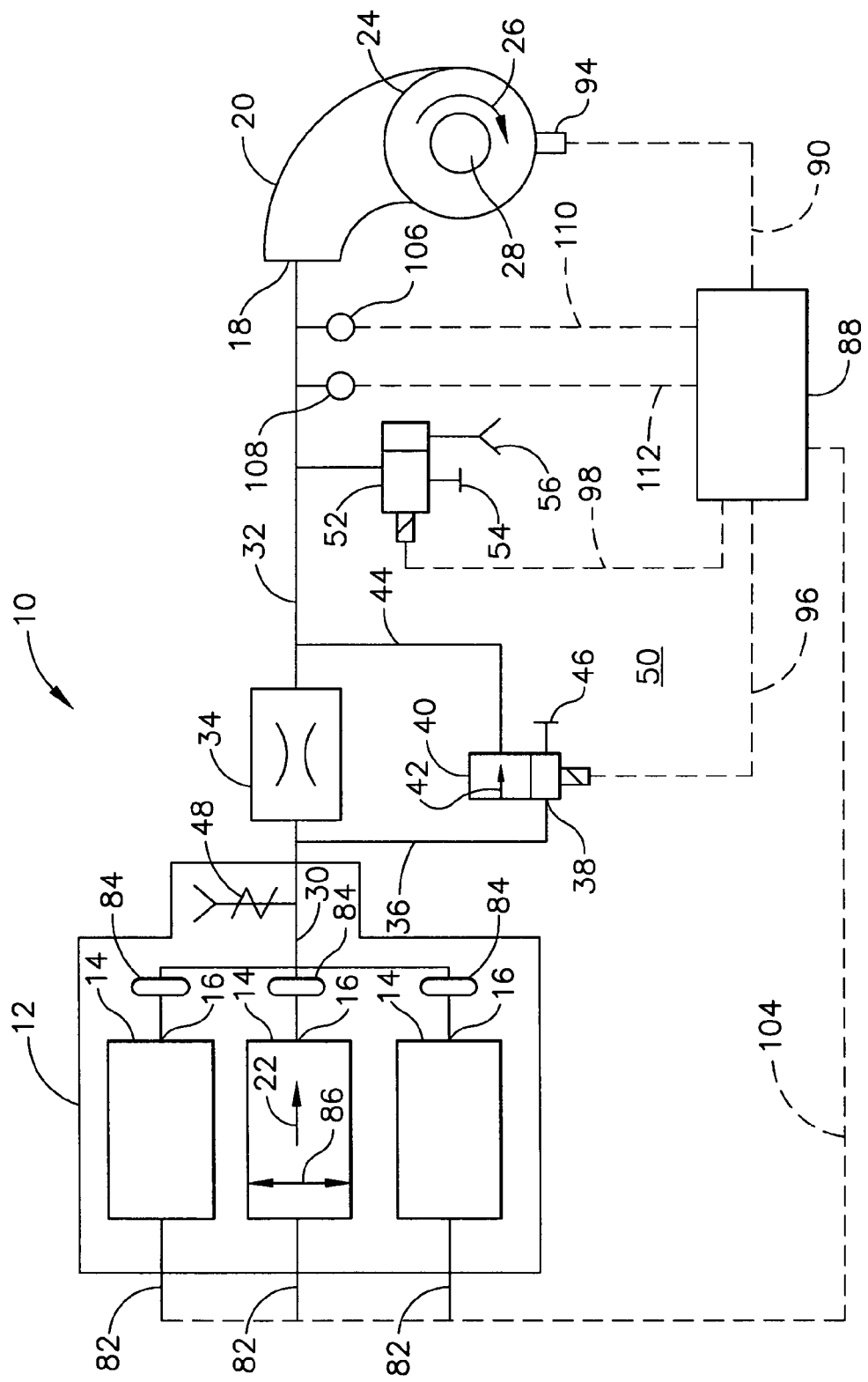
FIG. 1 is block diagram of an embodiment of the present invention.

As shown in FIG. 1, an embodiment of an emergency power system of the present invention, generally referred to as 10, may include a gas generator assembly 12, which may include a plurality of solid propellant gas generators 14. Each of the solid propellant gas generators 14 may have a gas outlet 16, which may be in fluid communication with a turbine inlet 18 of a gas turbine housing 20 each through a check valve 84.

Gas 22 generated by any one, or all of the solid propellant gas generators 14 may thus be delivered to turbine inlet 18 to produce rotation at a rotational speed 26 of a turbine wheel 24 disposed within gas turbine housing 20. Rotation of turbine wheel 24 may then cause rotation of turbine output shaft 28, which may be in rotational communication with an input shaft of an electric generator (not shown), a hydraulic pump (not shown), or any other system requiring power.

In some embodiments, gas outlet 16 may be in fluid communication with turbine wheel 24 through a flow restriction orifice 34. For example, a first conduit 30, may be in fluid communication with a second conduit 32 through flow restriction orifice 34, which may have a fixed area or may have a variable area. In an embodiment, flow restriction orifice 34 may include a pressure recovery venture-type orifice (e.g., having converging-diverging sections). Second conduit 32 may then be in fluid communication with turbine wheel 24 through turbine inlet 18.

In addition, gas outlet 16 may be in fluid communication with turbine wheel 24 through a flow control valve 40. For example, first conduit 30 may be in fluid communication with a third conduit 36. Third conduit 36 may be in fluid communication with a flow control valve inlet 38 of flow control valve 40. Flow control valve 40 may have a first control valve position 42 wherein flow control valve inlet 38 may be in fluid communication with second conduit 32 through flow control valve 40 and through a fourth conduit 44.

Flow control valve 40 may also have a second control valve position 46 wherein flow control valve inlet 38 may be closed thus preventing a flow of gas 22 there through. Emergency power system 10 may also include a pressure relief valve 48, which may be vented to an external environment 50. In addition, the present invention may include a vent valve 52 in fluid communication with gas outlet 16 which may be capable of providing fluid communication between gas outlet 16 and external environment 50.

Vent valve 52 may be located after (i.e., downstream from) flow restriction orifice 34, but before turbine inlet 18. Vent valve 52 may have a first vent valve position 54 which prevents fluid communication between gas outlet 16 and external environment 50. Vent valve 52 may also include a second vent valve position 56 which may provide for fluid communication between gas outlet 16 and external environment 50.

Flow control valve 40 may be capable of being controlled to provide a variable area gas valve thus providing a means for adjusting an effective area of gas outlet 16 of solid propellant gas generators 14. In an embodiment, control of flow control valve 40 may be obtained by utilizing a system controller 88, which may receive a rotational speed input 90 from a rotational speed sensor 94, which may provide a signal indicating the rotational speed 26 of turbine wheel 24. System controller 88 may then provide a flow control output signal 96 to flow control valve 40, which may select one of the control valve positions of control valve 40 (e.g., first control valve position 42, or second control valve position 46). Accordingly, system controller 88 may be capable of controlling flow control valve 40 by changing the position of flow control valve 40, based on a rotational speed 26 of turbine wheel 24. By controlling the position of control valve 40, system controller 88 may also control a pressure 86 within solid propellant gas generators 14.

In addition, vent valve 52 may be controlled utilizing system controller 88, which may receive rotational speed input 90 from a rotational speed sensor 94, which may provide a signal indicating the rotational speed 26 of turbine wheel 24. System controller 88 may then provide a vent valve control output signal 98 to vent valve 52, which may select one of the vent valve positions of vent valve 52 (e.g., first vent valve position 54 or second vent valve position 56). Accordingly, system controller 88 may be capable of controlling a vent valve position of vent valve 52 based on a rotational speed 26 of turbine wheel 24. By controlling the position of vent valve 52, system controller 88 may also control a pressure 86 within solid propellant gas generators 14, which in turn may control rotational speed 26 of turbine wheel 24.

In some embodiments, emergency power system 10 may include one or more pressure transducers, temperature sensors, or both, arranged between gas outlet 16 and turbine wheel 24. For example, FIG. 1 shows a pressure transducer 106 and a temperature sensor 108 arranged prior to turbine inlet 18 along second conduit 32. Accordingly, one or more pressure transducers 106 and/or temperature sensors 108 may be included along any conduit of emergency power system 10. For example, one or more pressure transducers 106 and/or temperature sensors 108 may be included before, after, or both before and after flow restriction orifice 34, flow control valve 40 (not shown).

System controller 88 may then provide a flow control output signal 96 to flow control valve 40 as discussed above, which may be based at least in part on a pressure output signal 110 of at least one of the one or more pressure transducer(s) 106 present. System controller 88 may also be capable of providing a flow control output signal 96 to flow control valve 40, and/or vent valve control output signal 98 to vent valve 52 as discussed above, which may be based at least in part on a temperature output signal 112 from at least one of the one or more of temperature sensor(s) 108 present. Accordingly, system controller 88 may be capable of utilizing pressure output signal 110, and/or temperature output signal 112, or the like to provide control over pressure 86 within solid propellant gas generators 14.

In an embodiment, gas generators 14 may be sized to meet a minimum power level expected for a maximum duration of a duty cycle (e.g., for about 5 to about 10 minutes). Accordingly, gas generators 14 may be lighter/smaller than would otherwise be required. However, compressed gas tank 68, acting as a high pressure storage vessel, may be included within the system to meet power spikes and other potential higher power demands which may occur during operation.

Figure 2:
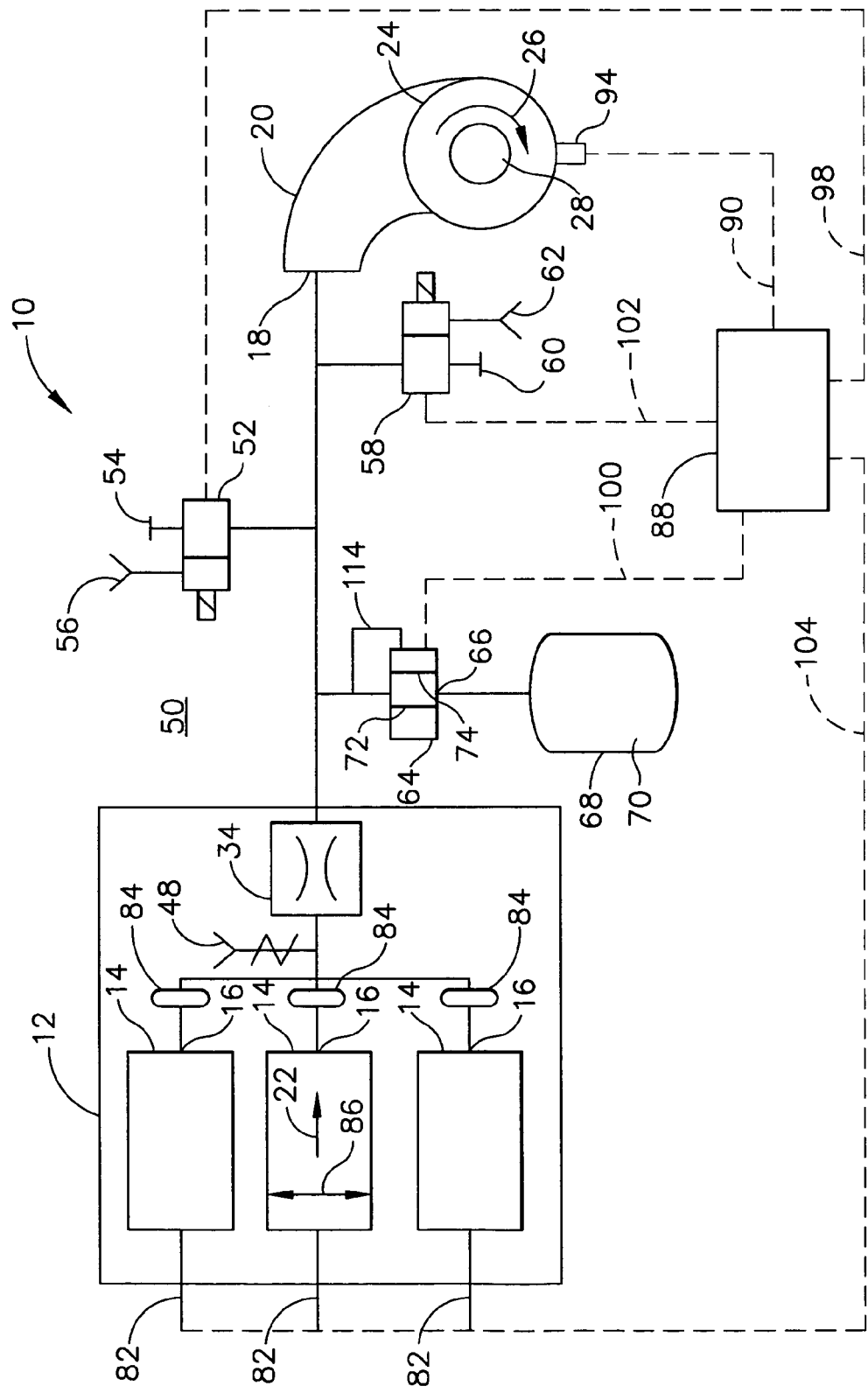
FIG. 2 is a block diagram of another embodiment of the present invention.

As shown in FIG. 2, an embodiment of emergency power system 10 may include a plurality of solid propellant gas generators 14 each having a gas outlet 16 in fluid communication with a turbine inlet 18 of a gas turbine housing 20 through a flow restriction orifice 34. In addition, the present invention may include vent valve 52 in fluid communication with gas outlet 16 which may be capable of providing fluid communication between gas outlet 16 and external environment 50.

Similar to flow control valve 40 (see FIG. 1), vent valve 52 may be capable of being controlled to provide a means for adjusting an effective area of the gas outlet 16 of the solid propellant gas generators 14. In an embodiment, vent valve 52 may be controlled utilizing a system controller 88, which may receive a rotational speed input 90 from a rotational speed sensor 94, which may provide a signal indicating the rotational speed 26 of turbine wheel 24. System controller 88 may then provide a vent valve control output signal 98 to vent valve 52, which may select one of the vent valve positions of vent valve 52 (e.g., first vent valve position 54 or second vent valve position 56). Accordingly, system controller 88 may be capable of controlling a vent valve position of vent valve 52 based on a rotational speed 26 of turbine wheel 24. By controlling the position of vent valve 52, system controller 88 may also control a pressure 86 within solid propellant gas generators 14, which in turn may control rotational speed 26 of turbine wheel 24.

In an embodiment, emergency power system 10 may further include a dump valve 58, which may have a first dump valve position 60 that prevents fluid communication between gas outlet 16 and external environment 50. Dump valve 58 may also have a second dump valve position 62 which provides fluid communication between gas outlet 16 and external environment 50.

In an embodiment, emergency power system 10 may also include a compressed gas assist valve 64 having a compressed gas assist valve inlet 66 in fluid communication with a compressed gas tank 68, which may contain a compressed gas 70 (i.e., compressed gas 70 may be disposed within compressed gas tank 68). Compressed gas assist valve 64 may be capable of providing fluid communication between compressed gas 70 and turbine wheel 24.

Compressed gas assist valve 64 may have a first compressed gas assist valve position 72 which prevents compressed gas 70 from flowing out of compressed gas tank 68. Compressed gas assist valve 64 may also have a second compressed gas assist valve position 74, which may provide for fluid communication between compressed gas assist valve inlet 66 and turbine inlet 18 through compressed gas assist valve inlet 66. As such, compressed gas assist valve 64 may function as a shutoff and pressure regulating valve and thereby include a compressed gas assist valve pressure feedback loop 114 to provide pneumatic regulation of the flow of compressed gas 70 there through. Accordingly, compressed gas assist valve 64 may serve as a shutoff valve only, or as both a shutoff valve and a downstream pressure regulating valve.

System controller 88, may also be capable of providing control over rotational speed 26 of turbine wheel 24 by providing a compressed gas assist valve control signal 100 to compressed gas assist valve 64 which may open the valve to increase rotational speed 26, or a dump valve control signal 102 to dump valve 58 and/or a vent control signal 98 to vent valve 52 to decrease rotational speed 26, which may select one of the possible valve positions (e.g., first compressed gas assist valve position 72 or second compressed gas assist valve position 74, first dump valve position 60, or second dump valve position 62, and first vent valve position 54 or second vent valve position 56). Accordingly, system controller 88 may be capable of providing control over pressure 86 within solid propellant gas generators 14, which in turn may control rotational speed 26 of turbine wheel 24.

In addition, system controller 88 may be capable of providing control over rotational speed 26 of turbine wheel 24 by providing one or more actuation signals 104 to one or more remote actuators 82 of solid propellant gas generators 14 when each gas generator is depleted of propellant.

In an embodiment, gas generator assembly 12 may comprise a plurality of solid propellant gas generators 14, each of which may be capable of producing gas 22 upon actuation. Each of solid propellant gas generators 14 may be individually actuated remotely by an actuation means 80 (see FIG. 3) of the type known to those of skill in the art. Each of solid propellant gas generators 14 may also be simultaneously actuated remotely.

In an embodiment, gas generator assembly 12 may include three or more solid propellant gas generators 14. In another embodiment, gas generator assembly 12 may include four or more solid propellant gas generators 14. In still another embodiment, gas generator assembly 12 may include five or more solid propellant gas generators 14.

Figure 3:
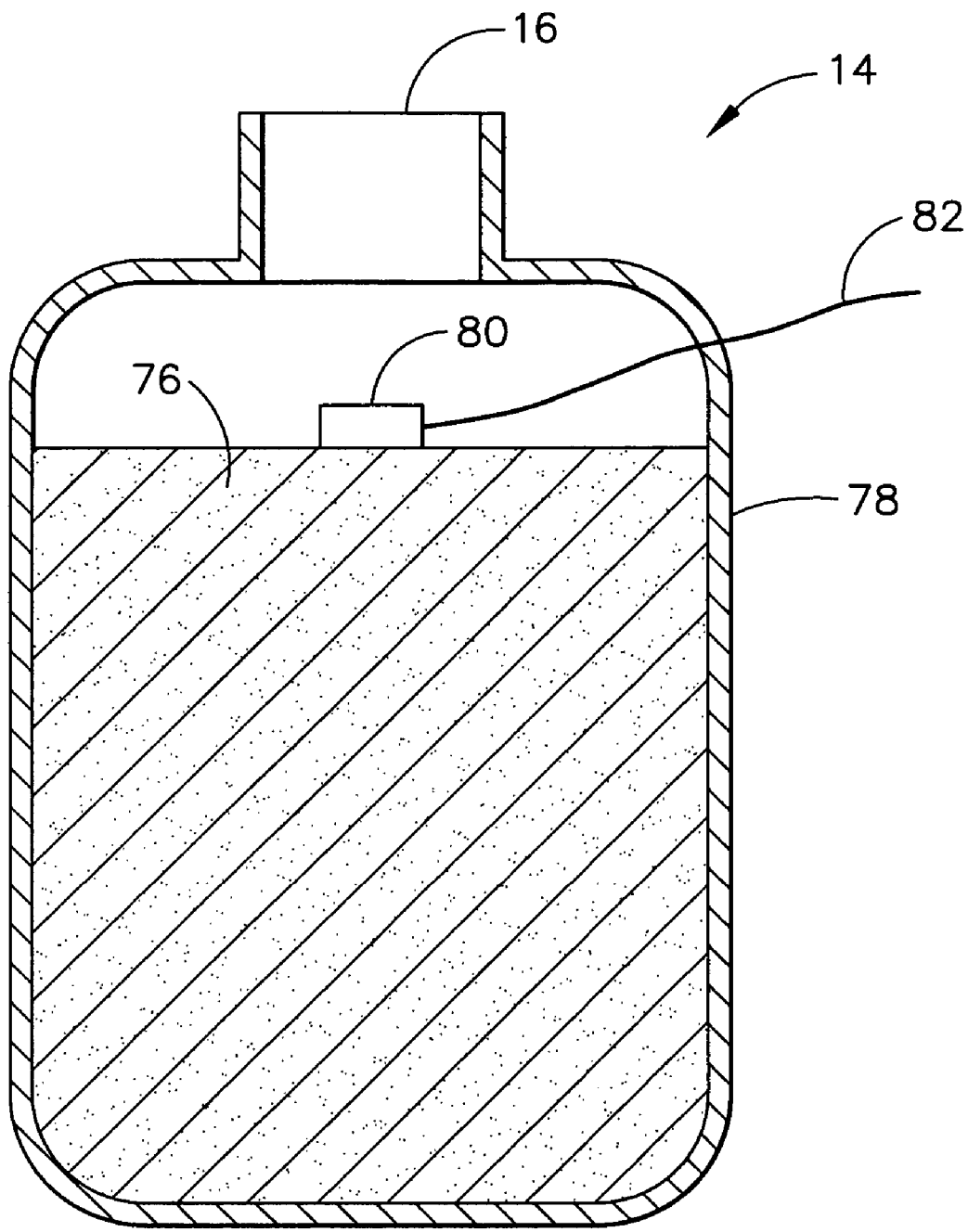
FIG. 3 is a side view of a solid propellant gas generator of the present invention.

As shown in FIG. 3, solid propellant gas generators 14 may each comprise a solid propellant 76 disposed within a canister 78 having gas outlet 16. Each of solid propellant gas generators 14 may also include an actuation means 80, which may actuate solid propellant 76 via a remote actuator 82. Each of solid propellant gas generators 14 may be capable, upon actuation, of providing an amount of gas 22 at a pressure sufficient to rotate turbine wheel 24 (see FIGS. 1 and 2). In an embodiment, each of solid propellant gas generators 14 may be able to produce at least about 10 horse power for about 5 to about 10 minutes. In another embodiment, each of solid propellant gas generators 14 may be able to produce at least about 23 horse power for about 5 to about 10 minutes. In still another embodiment, each of solid propellant gas generators 14 may be able to produce at least about 55 horse power for about 5 to about 10 minutes.

In an embodiment, each of solid propellant gas generators 14 may comprise a solid propellant 76 comprising cooling salts or the like, such that each of solid propellant gas generators 14 may be capable, upon actuation, of providing a gas 22 having a temperature at the turbine wheel 24 (see FIGS. 1 and 2) of less than about 1800° F. In another embodiment, each of solid propellant gas generators 14 may comprise a solid propellant 76 comprising cooling salts or the like, such that each of solid propellant gas generators 14 may be capable, upon actuation, of providing a gas 22 having a temperature at the turbine wheel 24 of less than about 1500° F. In still another embodiment, each of solid propellant gas generators 14 may comprise a solid propellant 76 comprising cooling salts or the like, such that each of solid propellant gas generators 14 may be capable, upon actuation, of providing a gas 22 having a temperature at the turbine wheel 24 of less than about 1300° F.

In an embodiment, each of solid propellant gas generators 14 may comprise a solid propellant 76 in an amount capable of providing an amount of gas 22 (i.e., having a gaseous output) such that a pressure of gas 22 at turbine inlet 18 may be about 200 to about 1000 psi for a period of about 5 minutes or more during operation. In another embodiment, each of solid propellant gas generators 14 may comprise a solid propellant 76 in an amount capable of providing an amount of gas 22 such that a pressure of gas 22 at turbine inlet 18 may be about 200 to about 1000 psi for a period of about 10 minutes or more.

In operation, the amount of gas 22 supplied to gas turbine housing 20 may be controlled via varying the pressure 86 within one or more of the actuated solid propellant gas generators 14. The pressure 86 may be varied by selecting the position of flow control valve 40. The position of flow control valve 40 may be controlled via a system controller 88 which may receive a rotational speed input 90 relating to rotational speed 26 of turbine wheel 24 (i.e., a system controller in communication with flow control valve 40, which is responsive to rotational speed 26 of turbine wheel 24), and which may output flow control signals 92 to flow control valve 40.

Also in operation, the burn rate of the solid propellant may occur according to the equation:

$$\text{Burn rate, } r = a\, P^n e^{\sigma_p (T_{soak} - T_{ref})} \quad [\text{inch/sec}]$$

where "a" is a coefficient which is a function of the solid propellant formulation, P is pressure 86, n is a pressure sensitivity exponent which is also a function of the solid propellant formulation, $\sigma_p$ is an ambient/initial temperature sensitivity exponent which is also a function of the solid propellant formulation, $T_{soak}$ is the initial soak temperature of the solid propellant, and $T_{ref}$ is the ambient temperature of external environment 50 of gas generator assembly 12.

Accordingly, an increase in pressure 86 may result in a faster burn rate, which may result in an increase of gas being delivered to gas turbine housing 20 (see FIGS. 1 and 2).

Figure 4:
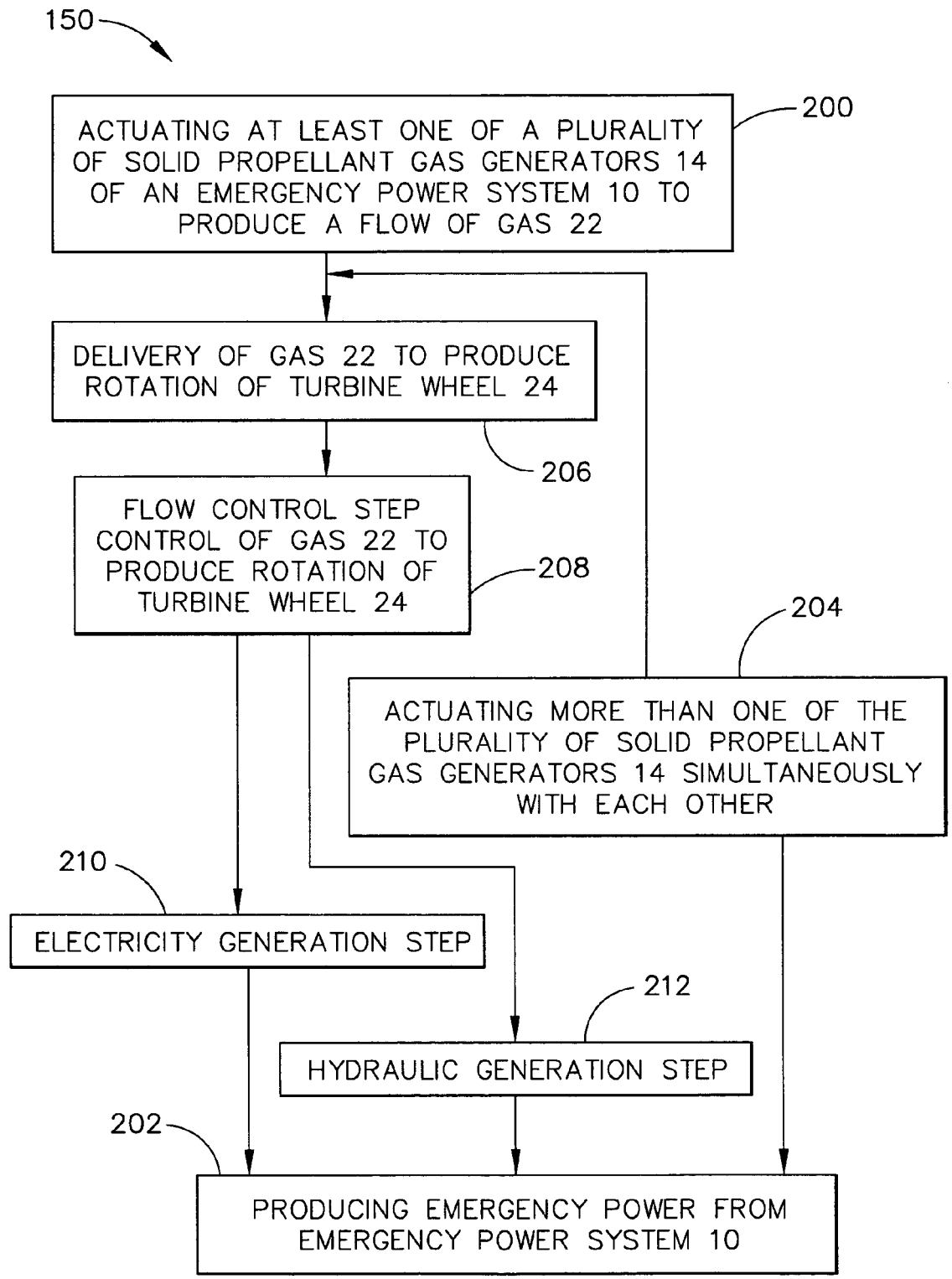
FIG. 4 is a flow chart depicting a method of the present invention.

As shown in FIG. 4, The present invention may include a method for providing emergency power 150 for providing emergency power to a vehicle from an emergency power system 10, which may thus include a first actuation step 200 which may include actuating at least one of a plurality of solid propellant gas generators 14 of an emergency power system 10 to produce a flow of gas 22 to produce rotation of turbine wheel 24, and a power production step 202, which may include producing emergency power from rotation of turbine wheel 24 of emergency power system 10. The method may further comprise an alternate individual actuation step 204, wherein more than one of the plurality of solid propellant gas generators 14 may be actuated simultaneously with each other to produce gas 22. In addition, one of the plurality of solid propellant gas generators 14 may also be actuated at various times, e.g., at various times subsequent to first actuation step 200 to produce gas 22.

In an embodiment, method 150 for providing emergency power may also include a gas delivery step 206, wherein gas 22 is delivered from solid propellant gas generators 14 to produce rotation of turbine wheel 24 through one or more conduits, orifices, valves, and/or the like. Method 150 for providing emergency power may also include flow control step 208, wherein a flow of gas 22 is controlled through flow restriction orifice 34, through flow control valve 40, through vent valve 52, through dump valve 58, and/or the like, which may also include utilizing system controller 88, one or more pressure transducers 106, temperature sensors 108, and/or the like. Accordingly, an embodiment of method 150 for providing emergency power may include controlling a flow of gas 22 using a flow restriction orifice 34, and flow control valve 40, wherein emergency power system 10 further comprises system controller 88 in communication with vent valve 52, and which system controller 88 may be responsive to rotational speed 26 of turbine wheel 24.

Method 150 for providing emergency power may also include an electricity generation step 210, wherein turbine output shaft 28 may be coupled to an input shaft of an electric generator (not shown), to produce electric power. Also, method 150 for providing emergency power may include a hydraulic generation step 212, wherein turbine output shaft 28 may be coupled to an input shaft of a fluid pump (not shown), to produce pressurized fluid.

It should be understood, of course, that the foregoing relates to exemplary embodiments of the invention and that modifications may be made without departing from the spirit and scope of the invention as set forth in the following claims.

We claim:

1. An emergency power system comprising:
   a plurality of solid propellant gas generators, each of said solid propellant gas generators having a gas outlet in fluid communication with a first conduit;
   said first conduit in fluid communication with a second conduit through a fixed or variable area flow restriction orifice;
   said first conduit in fluid communication with a third conduit;
   said third conduit in fluid communication with a flow control valve inlet of a flow control valve;
   said flow control valve having a first control valve position wherein said flow control valve inlet is in fluid communication with said second conduit through said flow control valve;
   said flow control valve further having a second control valve position wherein said flow control valve inlet is closed;
   said flow control valve further having a third control valve position wherein said flow control valve inlet is in fluid communication with an external environment;
   said second conduit in fluid communication with a turbine inlet of a gas turbine housing;
   each of said solid propellant gas generators being individually actuatable to provide a gaseous output capable of rotating a turbine wheel rotationally disposed within said gas turbine housing; and
   said turbine wheel being in rotational communication with an electric generator input shaft, a fluid pump input shaft, or with both said electric generator input shaft and said fluid pump input shaft, of said emergency power system.

2. The emergency power system of claim 1, further comprising a system controller capable of controlling said flow control valve position based on a rotational speed of said turbine wheel.

3. The emergency power system of claim 1, further comprising one or more pressure transducers disposed in fluid communication with said gaseous output of said solid propellant gas generators, each of said pressure transducers being capable of providing a pressure output signal.

4. The emergency power system of claim 3, further comprising a system controller capable of controlling said flow control valve based at least in part on said pressure output signal of at least one of said one or more pressure transducers.

5. The emergency power system of claim 1, further comprising one or more temperature sensors disposed in thermal communication with said gaseous output of said solid propellant gas generators, each of said temperature sensors capable of providing a temperature output signal.

6. The emergency power system of claim 5, further comprising a system controller capable of controlling said flow control valve based on a temperature output signal of at least one of said one or more temperature sensors.

7. An emergency power system comprising:
a plurality of solid propellant gas generators each having a gas outlet in fluid communication with a turbine wheel rotationally disposed within a gas turbine housing;
a fixed or variable area flow restriction orifice disposed between, and in fluid communication with, said gas outlets and said turbine wheel;
a vent valve in fluid communication with said gas outlet, said vent valve capable of providing fluid communication between said gas outlet and an external environment;
each of said solid propellant gas generators being individually actuatable to provide a gaseous output capable of rotating said turbine wheel rotationally disposed within said gas turbine housing;
said turbine wheel being in rotational communication with an electric generator input shaft, a fluid pump input shaft, or a combination of said electric generator input shaft and said fluid pump input shaft, of said emergency power system; and
a system controller capable of controlling said vent valve position based on a rotational speed of said turbine wheel.

8. The emergency power system of claim 7, further comprising a compressed gas assist valve having a compressed gas assist valve inlet in fluid communication with a compressed gas tank, wherein said compressed gas assist valve is capable of providing fluid communication between a compressed gas disposed within said compressed gas tank and said turbine wheel through said compressed gas assist valve inlet.

9. The emergency power system of claim 8, further comprising a system controller capable of controlling said compressed gas assist valve based on a rotational speed of said turbine wheel.

10. The emergency power system of claim 6, further comprising a dump valve capable of providing fluid communication between said gas outlet and said external environment, while said dump valve is further capable of simultaneously preventing fluid communication between said turbine wheel and said gas outlet.

11. The emergency power system of claim 10, further comprising a system controller capable of controlling said dump valve position based on a rotational speed of said turbine wheel.

12. An aircraft comprising an emergency power system, wherein said emergency power system comprises:
a plurality of solid propellant gas generators each having a gas outlet in fluid communication with a turbine wheel rotationally disposed within a gas turbine housing;
said turbine wheel being in rotational communication with an electric generator input shaft, a fluid pump input shaft, or a combination of said electric generator input shaft and said fluid pump input shaft, of said emergency power system;
a fixed or variable area flow restriction orifice disposed between, and in fluid communication with, said gas outlet and said turbine wheel;
a vent valve in fluid communication with said gas outlet, said vent valve capable of providing fluid communication between said gas outlet and an external environment; and
a system controller capable of controlling said vent valve based on a rotational speed of said turbine wheel, wherein each of said solid propellant gas generators is individually actuatable to provide a gaseous output capable of turning said turbine wheel.

13. An emergency power system comprising:
a plurality of solid propellant gas generators each having a gas outlet in fluid communication with a turbine wheel rotationally disposed within a gas turbine housing;
a fixed or variable area flow restriction orifice disposed between, and in fluid communication with, said gas outlet and said turbine wheel;
a vent valve in fluid communication with said gas outlet, said vent valve capable of providing fluid communication between said gas outlet and an external environment;
a compressed gas assist valve having a compressed gas assist valve inlet in fluid communication with a compressed gas tank, wherein said compressed gas assist valve is capable of providing fluid communication between a compressed gas disposed within said compressed gas tank and said turbine wheel through said compressed gas assist valve inlet;
a dump valve capable of providing fluid communication between said gas outlet and said external environment, while said dump valve is further capable of simultaneously preventing fluid communication between said turbine wheel and said gas outlet;
a system controller capable of controlling said vent valve, said compressed gas assist valve, and said dump valve based on a rotational speed of said turbine wheel;
wherein each of said solid propellant gas generators is individually actuatable to provide a gaseous output capable of turning said turbine wheel;
wherein each of said solid propellant gas generators is capable of providing said gaseous output having a temperature at said turbine wheel of about 1800° F. or less;
wherein each of said solid propellant gas generators comprises a solid propellant in an amount capable of providing said gaseous output in an amount to produce a pressure of gaseous output at said turbine wheel of about 200 psi to about 1000 psi for a period of at least about 5 minutes; and said turbine wheel being in rotational communication with an electric generator input shaft, a fluid pump input shaft, or a combination thereof, of said emergency power system.

14. A method of providing emergency power, the method comprising:

actuating a plurality of solid propellant gas generators of an emergency power system simultaneously with each other to produce a gas;

delivering said gas to a turbine wheel rotationally disposed with a gas turbine housing to produce rotation of said turbine wheel;

coupling an output shaft of said turbine wheel to an input shaft of an electric generator, to an input shaft of a fluid pump, or to both an input shaft of an electric generator and input shaft of a fluid pump; and producing emergency power from said electric generator, producing emergency power from said fluid pump, or producing emergency power from both said electric generator and from said fluid pump, wherein said emergency power system comprises;

said plurality of solid propellant gas generators, each of said solid propellant gas generators having a gas outlet in fluid communication with a first conduit;

said first conduit in fluid communication with a second conduit through a fixed or variable area flow restriction orifice;

said first conduit in fluid communication with a third conduit;

said third conduit in fluid communication with a flow control valve inlet of a flow control valve;

said flow control valve having a first control valve position wherein said flow control valve inlet is in fluid communication with said second conduit through said flow control valve;

said flow control valve further having a second control valve position wherein said flow control valve inlet is closed;

said flow control valve further having a third control valve position wherein said flow control valve inlet is in fluid communication with an external environment; and said second conduit in fluid communication with a turbine inlet of said gas turbine housing.

15. A method of claim 14, further comprising controlling a flow of said gas using said fixed area flow restriction orifice and said vent valve, wherein said emergency power system further comprises a system controller in communication with said vent valve, wherein said system controller is responsive to a rotational speed of said turbine wheel.

* * * * *